United States Patent [19]

Motozawa et al.

[11] Patent Number: 4,728,141
[45] Date of Patent: Mar. 1, 1988

[54] AUTOMOTIVE REAR SHELF STRUCTURE

[75] Inventors: Yasuki Motozawa, Tochigi; Tatsuo Masuda; Shuichi Yamamoto, both of Kanagawa, all of Japan

[73] Assignee: Honda Giken Kogyo Kabushiki Kaisha, Tokyo, Japan

[21] Appl. No.: 868,137

[22] Filed: May 28, 1986

[30] Foreign Application Priority Data

May 31, 1985 [JP] Japan .............................. 60-82355[U]
Jun. 1, 1985 [JP] Japan .................................. 60-119474

[51] Int. Cl.$^4$ ................................................. B60R 5/00
[52] U.S. Cl. .................................... 296/37.16; 242/107
[58] Field of Search ...................... 296/37.8, 37.16, 76; 242/107, 107.3

[56] References Cited

U.S. PATENT DOCUMENTS 3,910,625 10/1975 Menard ......................... 296/37.16 X
4,010,913 3/1977 Guerster et al. ...................... 242/107
4,222,601 9/1980 White et al. ........................ 296/37.16
4,385,736 5/1983 Yamamoto ............................ 242/107

FOREIGN PATENT DOCUMENTS 1031936 6/1966 United Kingdom ................. 242/107

Primary Examiner—Robert B. Reeves
Assistant Examiner—Russell D. Stormer
Attorney, Agent, or Firm—Lyon & Lyon

[57] ABSTRACT

A cable retractor having a spring loaded reel for winding a cable thereonto. The tension applied to the cable by the cable retractor is made to change as the take out length of the cable changes either by changing the effective radius of the reel or the effective spring constant of a spring member biasing the reel. Such a cable retractor can be advantageously applied to a rear shelf structure which lifts a rear shelf cooperative with the opening action of the tail gate of a three-door or five-door car by attaching the cable retractor to either the tail gate or the rear shelf and the free end of the cable taken out from the cable retractor to the other of the tail gate and the rear shelf. Thus, the rear shelf will not droop due to the increase in the tension of the cable when the tail gate is fully open and the cable retractor will not apply undue resistance to the tail gate in the early phase of opening the tail gate. Part of the cable may be still left wound on the reel when the tail gate is fully open so that the rear shelf may be moveable even when the tail gate is fully open.

10 Claims, 9 Drawing Figures

AUTOMOTIVE REAR SHELF STRUCTURE

TECHNICAL FIELD

This invention relates to a rear shelf structure according to which a rear shelf provided behind the rear seats of an automobile lifts itself cooperative with the opening action of a tail gate provided in the rear end of the automobile for better access to a luggage space provided behind the rear seats in a so-called three-door car or five-door car, and a retractor device which may be advantageously used for such an application.

BACKGROUND OF THE INVENTION

In a so-called three-door car or five-door car, a luggage space defined directly behind the rear seats is directly connected with the passenger compartment as opposed to a trunk space of a normal passenger car which is substantially enclosed by the car body, and a tail gate or a door for the rear end of the car is provided for the access to this luggage space from the rear end of the car in substantially the same way a trunk lid is provided for a trunk provided in the rear end of a normal passenger car. The tail gate may be hinged either at its upper end to the rear end of the roof or at its lower end to the rear end of the floor. Alternatively, the tail gate may be hinged at its side end to the side wall of the car body. In such a vehicle having a tail gate, a rear shelf is often provided in the rear of the rear seats so as to hide the luggage space from the view of the passengers. Typically, a rear shelf is hinged at its forward end to a fixed member which is fixed adjacent to the rear surface of an upper part of the rear seats.

Since the rear shelf is often required to be lifted up to allow easy access to the luggage space particularly when bulky luggage is to be stored in the luggage space, it is convenient to have the rear shelf lift itself automatically when the tail gate is opened. According to a known structure, a cable is connected to the rear shelf at its one end and to a part of the tail gate at its other end so that the tension applied to the cable upon opening of the tail gate may lift the rear shelf out of the way. However, since the length of the cable is fixed, a slight misadjustment of the length of the cable or excessive slack in the cable when the tail gate is fully open. In the former case the cable could be broken by the inertia of the tail gate when it is forcibly opened and in the latter case the rear shelf will not lift itself to a sufficient extent and the rear shelf will droop down when the tail gate is fully open. Furthermore, the slack in the cable when the tail gate is closed is not only unfavorable from an aesthetic view point but also could be caught by luggage or a part of the car body.

Under this circumstance, it is conceivable to provide a cable retractor having a spring loaded reel for winding the cable thereinto so that no excessive tension nor excessive slack may develop in the cable. However, when the cable is to be fully taken out from the reel when the door is fully open, the cable may still be subject to an excessive tension. If part of the cable is to be left wound on the reel even when the tail gate is fully open, then the tension in the cable may not be sufficient to keep the rear shelf in its uplifted state since the lift of the rear shelff is determined by the balance between the weight of the rear shelf itself and the spring force of the reel. If the spring force of the retractor is increased so as to oppose the tendency of the rear shelf to droop, then the force required to open the tail gate will unduly increase.

BRIEF SUMMARY OF THE PRESENT INVENTION

In view of such problems of the prior art, a primary object of the present invention is to provide a rear shelf structure according to which the cable for the cooperative action of the rear shelf with the tail gate will not be subjected to an excessive tension but the rear shelf can be lifted to a sufficient height when the tail gate is fully opened.

Another object of the present invention is to provide a rear shelf structure which cooperates with a tail gate and yet will not substantially increase the force required to open the tail gate.

Yet another object of the present invention is to provide a rear shelf structure which cooperates with a tail gate and is durable against load applied to the rear shelf.

Yet another object of the present invention is to provide a cable retractor which can be conveniently used in such a rear shelf structure.

Yet another object of the present invention is to provide a cable retractor which allows cable to be taken out therefrom with a relatively small pulling force in an initial stage but produces a relatively large winding force, while leaving a certain length of the cable therein, as more of the cable is taken out from the cable retractor According to the present invention, such objects are accomplished by providing a rear shelf structure for lifting a rear shelf provided behind a rear seat cooperative with the opening action of a tail gate, comprising: a winding device attached to either one of the tail gate and the rear shelf; cable means having one end wound by the winding device and another end connected to the other one of the tail gate and the rear shelf; the winding device comprising a reel for winding the cable means, and spring means for biasing the reel so as to wind the cable means onto the reel, the length of the cable means being such that a certain part of the cable means is still left wound on the reel even when the tail gate is fully open, the effective tension which the spring means applies to the cable means being greater when the tail gate is substantially fully open than when the tail gate is substantially closed.

The tension produced in the cable means by the winding device may be varied in the course of taking out the cable means either by changing the effective spring constant of the spring means or the effective winding radius of the reel. When such a cable winding device is applied to a rear shelf structure, by increasing the tension applied to the cable means at the time when the tail gate is near its fully open position, the rear shelf will not tend to droop. Furthermore, since the rear shelf is allowed to move up and down even when the tail gate is fully open, the cable means will not break.

According to certain aspect of the present invention, the winding device or the cable retractor comprises a reel which is supported in a freely rotatable manner and having a first gear fixedly attached thereto; first spring means for biasing the reel so as to wind the string-like object thereonto; a second gear of a greater diameter than the first gear which is supported in a freely rotatable manner and meshes with the first gear; second spring means which engages a projection provided in the second gear when the string-like object has been taken out from the reel beyond a certain extent. Thus, initially, the reel is biased only by the first spring means but as the cable means is taken out beyond a certain extent both the first and the second spring means act upon the cable means and the tension of the cable means is increased.

According to another aspect of the present invention, the cable retractor comprises a first reel which is supported in a freely rotatable manner; a second reel supported on the outer periphery of the first reel in a freely rotatable manner relative to the first reel; the first reel being spring biased toward a one direction, the second reel being provided with a gap through which the string-like object may pass thorough so as to be wound on both the first and the second reel. Thus, initially, the cable means is unwound from the second reel having a relatively large diameter but as the cable means is taken out beyond a certain extent the cable means is unwound from the first reel having a relatively small diameter and the tension of the cable means is increased.

BRIEF DESCRIPTION OF THE DRAWINGS

The present invention will now be shown and described in the following in terms of concrete embodiments thereof with reference to the appended drawings, in which.

PREFERRED EMBODIMENTS OF THE PRESENT INVENTION

Now specific embodiments of the present invention are described in the following with reference to the appended drawings.

Figure 1:
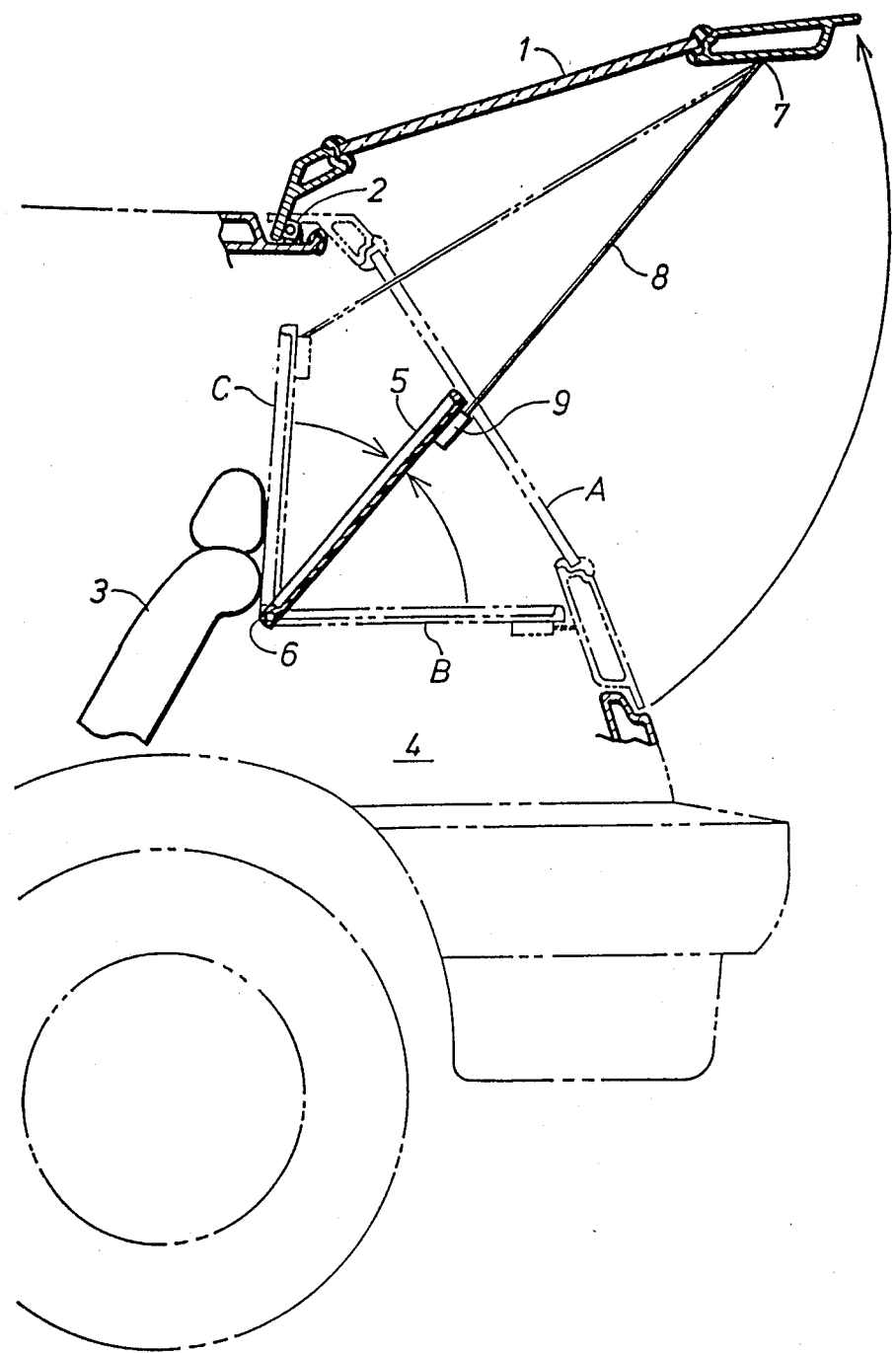
FIG. 1 is a side view illustrating the action of an embodiment of the cooperative rear shelf structure according to the present invention.

FIG. 1 shows a rear part of an automobile, and a tail gate 1 is allowed to open and close an opening provided in the tail end of the automobile by a pair of hinges 2 provided in the rear edge of the roof of the automobile. A luggage space 4 is defined on a floor surface immediately behind the rear seats 3, and the upper part of this luggage space 4 can be closed with a rear shelf 5 which is allowed to open and close by a pair of hinges 6 which are connected between the forward end of the rear shelf 5 and a fixed structural member not shown in the drawings. An end 7 of a cable 8 is attached to a lower portion of the tail gate 1, and the other end of the cable 8 is wound by a cable retractor 9 fixedly attached to the lower surface of the free end of the rear shelf 5.

Figure 2:
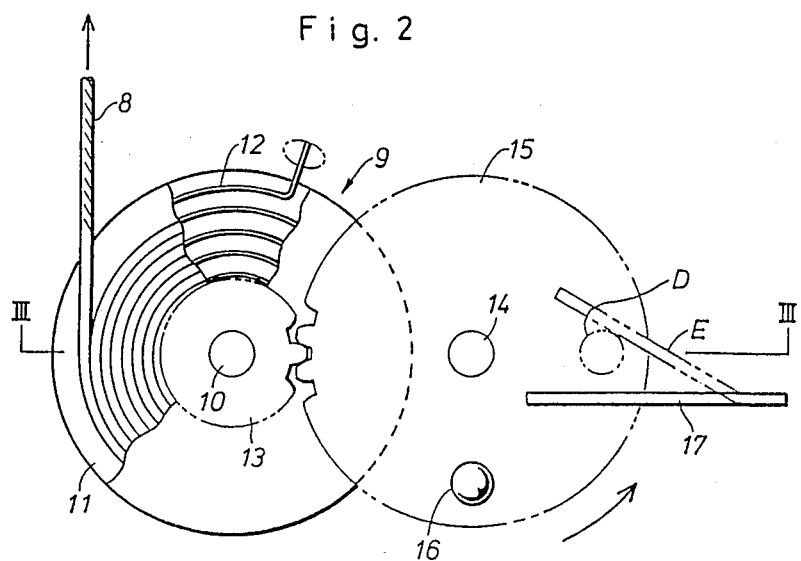
FIG. 2 is a partially broken away front view of the cable retractor given in FIG. 1, for illustrating the action thereof.
Figure 3:
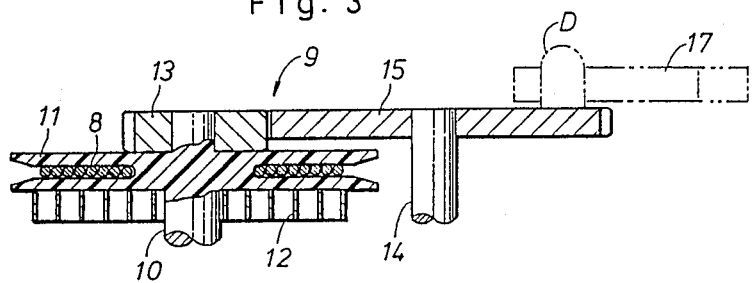
FIG. 3 is a sectional view taken along line III—III of FIG. 2.

FIGS. 2 and 3 show the cable retractor 9 given in FIG. 1 in greater detail. A reel 11 is integrally formed with a rotatable shaft 10 which is rotatably supported by the rear shelf 5 at its base end and is biased in counter-clockwise direction in the sense of FIG. 2 or, in other words, so as to wind the cable 8 onto the reel 11 by a torsion coil spring 12 whose one end is connected to the rear shelf 5 and other end to reel 11, respectively. The rear shelf 13 is fixedly secured to the free end of the rotatable shaft 10 and meshes with a large gear 15 which is rotatably supported by the rear shelf 5 by way of another rotatably shaft 14. A pin 16 projects towards the axial direction of the shaft 14 from an outer circumferential position of the large gear 15 in such a manner as to engage a sheet spring 17 which is fixedly secured to the rear shelf 5 at its other end when the cable 8 is taken out from the reel to a certain extent.

Figure 4:
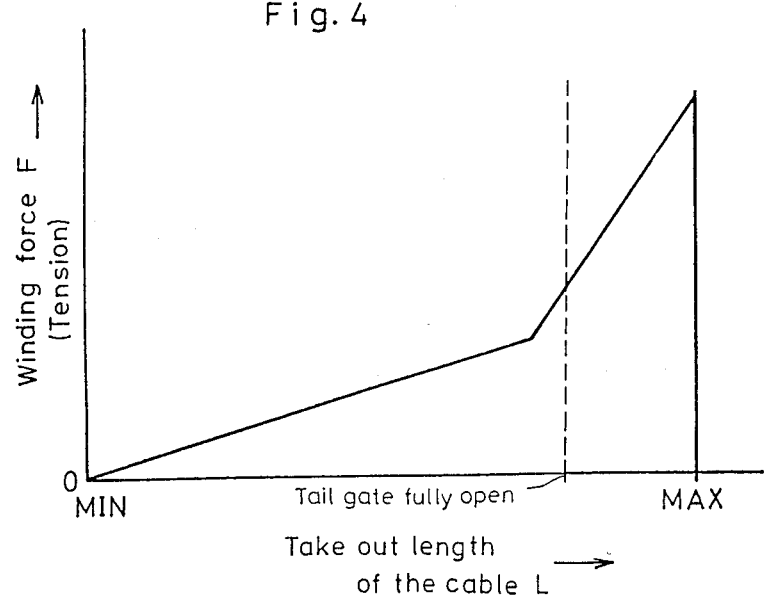
FIG. 4 is a graph showing the relationship between the take out length L of the cable and the winding force F of the cable retractor.

Therefore, as the cable 8 is taken out from the reel 11, only the torsion cable spring 12 applies a relatively small winding force to the reel 11 as indicated by an interval H shown in the graph of FIG. 4. However, as the cable 8 is taken out from the reel 11 beyond a certain extent and the large gear 15 rotates accordingly, the pin 16 engages the sheet spring 17 as indicated by imaginary lines D in FIG. 2 and the restoring force of the sheet spring 17 applied to the pin 16 is added to the force for winding the cable 8 onto the reel 11 as a result of the deflection of the sheet spring 17 as indicated by imaginary lines E in FIG. 2.

Thus, as indicated by interval G in FIG. 4, the restoring force of the sheet spring 17 is added to the restoring force of the torsion coil spring 12 in applying the winding force to the cable 8, and a spring force determined by a combination of the spring constants of these two springs comes to be applied to the cable 8. Here, the relationships between various members are selected so that the winding force F is zero or close to zero when the tail gate 1 is in its fully closed state, and the action of the sheet spring 17 is added to that of the torsion coil spring 12 when the tail gate 1 is near its fully open state but, even in the latter case, the cable 8 can be still taken out from the reel 11 if a pulling force which can overcome the combined spring force of the sheet spring 17 and the torsion coil spring 12 is applied to the cable 8.

Now the action of the above described embodiment is described in the following with reference to FIG. 1.

The tail gate 1 is in a position indicated by A when it is fully closed while the rear shelf 5 is held in a horizontal position by a stopper not shown in the drawings as indicated by B. In this state, the cable 8 is wound on the reel 11 of the cable retractor 9 to its full extent. Therefore, if the tail gate 1 is to be lifted from this position, only the spring force of the torsion coil spring 12 will applied to the cable 8 and the cable retractor 9 will exert very little resistance to the force which is going to lift the tail gate 1.

Normally, the force required to open the tail gate 1 depends not only on the weight of the tail gate 1 itself but also on the property of a balancer (not shown in the drawings) for the tail gate which may consist of a spring or a gas cylinder device for applying a biasing force to the tail gate 1 to the end of canceling the weight of the tail gate and reducing the force required to open the tail gate 1. Typically, since such a balancer tends to be inadequate in canceling the weight of the tail gate particularly when the tail gate is only slightly opened, the reduction in the resistance of the cable retractor 9 when the length of the cable taken out from the reel is small is significant.

The biasing force of the cable retractor 9 is generally proportional to the length of the cable 8 taken out from the reel, but it is also possible to keep the biasing force produced by the torsion coil spring 12 substantially constant irrespective of the length of the cable 8 taken out from the reel 11. However, in this case, the torsion coil spring 12 may be required to produce a certain biasing force even when the length of the cable taken out from the reel is zero or almost zero or when the door is fully or almost fully closed.

Now, when the tail gate 1 is lifted to its fully open position as indicated by solid lines in FIG. 1, the cable 8 is taken out from the cable retractor 9 beyond the certain extent, and the combined spring force of the torsion coil spring 12 and the sheet spring 17 applied to the cable 8 is now sufficiently strong to overcome the tendency of the rear shelf 5 to droop under its own weight and the rear shelf 5 is brought to an oblique position as shown by solid lines in FIG. 1. If a relatively heavy object is placed on the rear shelf 5 and the tail gate 1 is opened, the cable 8 will be taken out to a greater extent than normally is the case, but, since there is a certain margin in the take out stroke of the cable retractor 9, no great tension will develop in the cable 8 and the heavy object on the rear shelf 5 will not be toppled over.

When the tail gate 1 is in its fully open position, by pushing up the rear shelf 5 further, it will be lifted up to a substantially vertical position as indicated by C in FIG. 1 because of the margin in the take out stroke of the cable retractor 9. Therefore, when a relatively bulky object is to be stored in the luggage space 4, the rear shelf 5 can be pushed up by hand to the vertical position and the access to the luggage space 4 is further improved.

Although the cable retractor 9 was attached to the side of the rear shelf 5 in the above described embodiment, it is also possible to attach the cable retractor 9 to the side of the tail gate 1 instead of the rear shelf 5.

Thus, according to the above described embodiment, since the access to the luggage space of a three-door or a five-door car is substantially improved simply by adding a relatively simple cable retractor and the structure can withstand rough handling, the utility of the luggage space is improved and the durability of the luggage space structure is improved.

Figure 5:
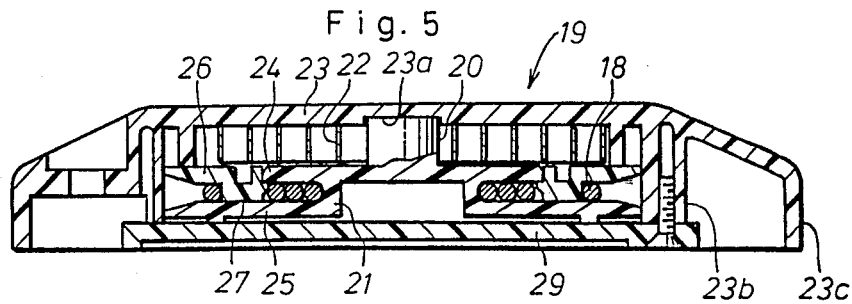
FIG. 5 is a partially broken away side view of another embodiment of the cable retractor according to the present invention, for illustrating the action thereof.

FIGS. 5 to 8 show another embodiment of the cable retractor according to the present invention which can be applied to a rear shelf structure such as the one shown in FIG. 1. As best shown in FIG. 5, a first reel 21 is integrally formed with a rotatable shaft 20 which is rotatably supported in a depression 23a provided in a central position of the inner wall surface of a casing 23 which is generally in the shape of a flat disc provided with coaxial collars 23b and 23c along the circumferential portions thereof, and is substantially received in a recess defined in the casing 23. The first reel 21 is biased in counterclockwise direction in the sense of FIG. 6 by a torsion coil spring 22 which is engaged to the casing 23 at its one end and to the first reel 21 at its other end, and the rear shelf end of the cable 18 is wound on the first reel 21.

The first reel 21 is provided with a small flange 24 which is adjacent to the torsion coil spring 22 and a large flange 25 which slides over the internal surface of a cover plate 29 covering the open side of the casing 23, and a second reel 26 having the same diameter as the large flange 25 is fitted over the outer circumferential surface of the small flange 24 so as to be freely rotatable relative to the first reel 21 by sliding over the internal side surface of the large flange 25 and the circumferential surface of the small flange 24. Thus, the two reels 21 and 26 define a pair of concentric cylindrical surfaces on which the cable 18 may be wound.

Figure 6:
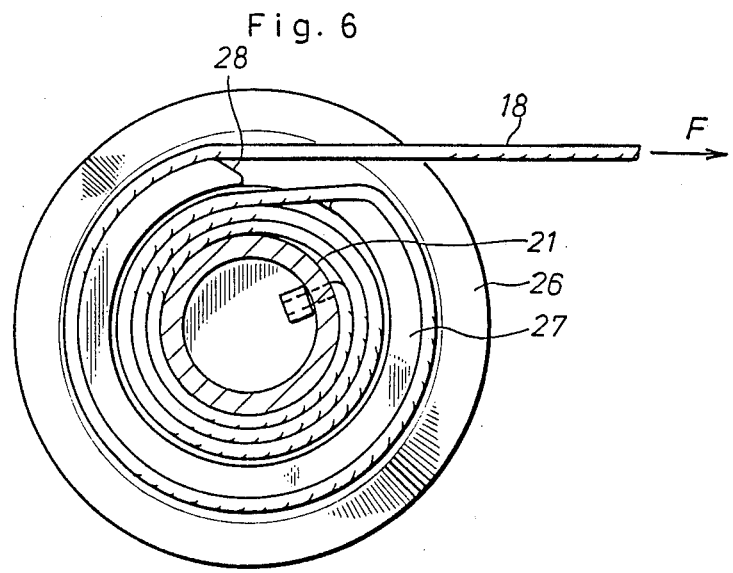
FIG. 6 is a sectional view of an essential portion of the cable retractor shown in FIG. 5, in an early phase of the opening action of the tail gate.
Figure 9:
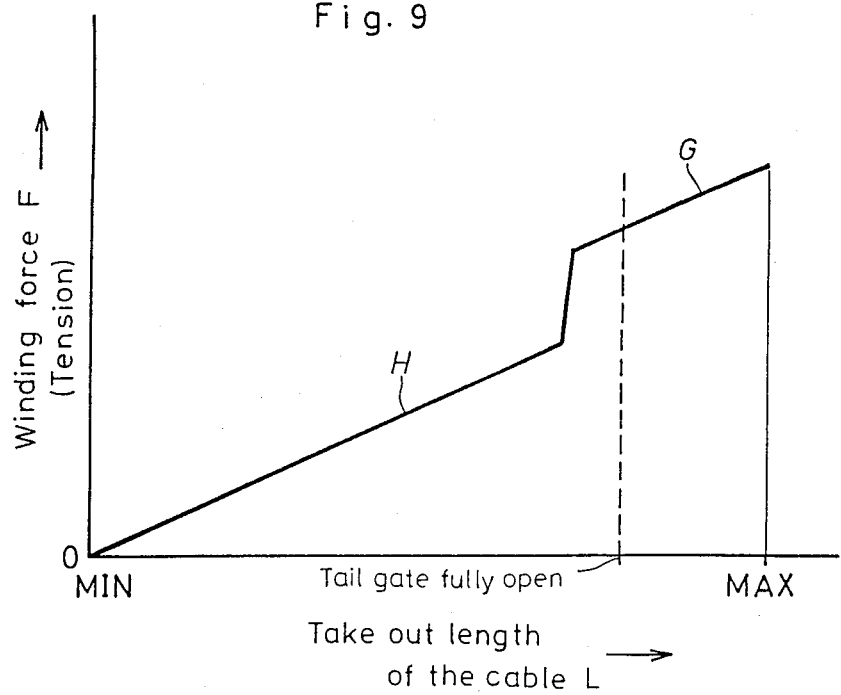
FIG. 9 is a graph showing the relationship between the take out length L of the cable and the winding force F of the cable retractor.

As best shown in FIG. 6, a main portion 27 of the second reel 26 sliding over the internal surface of the large flange 25 is formed in the shape of letter C and has a gap 28 so that the cable 18 may be wound onto the second reel 26 after being wound onto the first reel 21 and passed through the gap 28. Therefore, when the cable 18 is to be taken out from its fully wound state as shown in FIG. 6, since the cable 18 is taken out from the portion of the cable 18 wound on the main portion 27 of the second reel 26, the winding radius of the cable 18 is great and the winding force is relatively small as shown by interval H in FIG. 9 since distance between the center of the moment produced by the torsion coil spring 22 and the line of action of the tension F of the cable 18 is relatively great.

Figure 7:
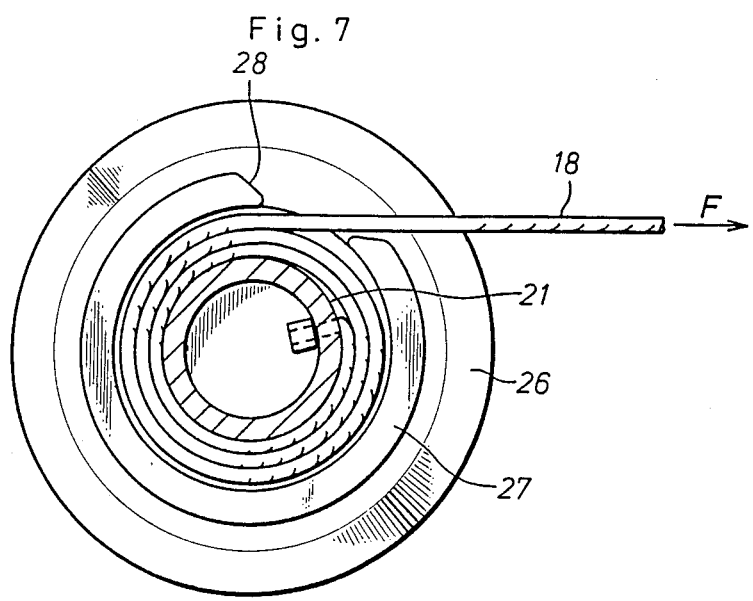
FIG. 7 is a sectional view similar to FIG. 6 when the tail gate is approaching its fully closed position.
Figure 8:
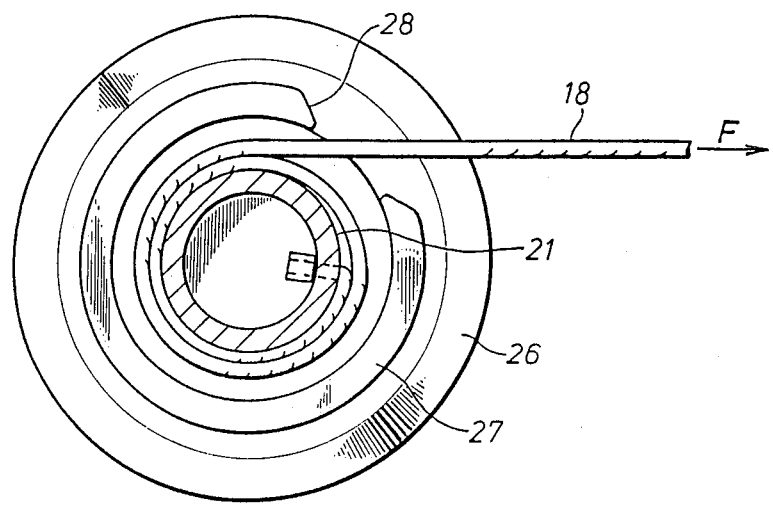
FIG. 8 is a sectional view similar to FIGS. 6 and 7 when the tail gate is in its fully closed position.

However, as the cable 18 is further taken out from the second reel 26 as shown in FIG. 7, since the cable 18 is now wholly unwound from the second reel 26 and taken out from the first reel 21 by way of the gap 28 of the second reel 26, the winding radius is relatively small and the winding force F applied to the cable 18 becomes accordingly great.

Here, the relationships between various members are selected so that the winding force F is zero or close to zero when the tail gate 1 is in its fully closed state, and some margin is provided to the cable 18 so as to have a portion thereof still wound on the reel 21 when the tail gate 1 is fully open (Refer to FIG. 8) so that the cable 18 can be still taken out from the reel 212 even when the tail gate is fully open if a force which can overcome the spring force of the torsion coil spring 22 is applied to the cable 18.

The action of the present embodiment as applied to the rear shelf structure is substantially the same as the previous embodiment.

Although the cable retractors 9, 19 of the present invention were applied to a rear shelf device which is cooperative with a tail gate of an automobile in the above described embodiments, it is also possible to apply the present invention to various other devices where cooperation of two moveable members are involved.

Thus, according to the present invention, since the pulling force of the cable retractor can be varied in stages by making use of a relatively simple structure, a substantial effect will be produced in improving the utility of a cable retractor.

We claim:

1. A rear shelf structure for lifting a rear shelf provided behind a rear seat cooperative with the opening action of a tail gate, comprising:
   a winding device attached to either one of the tail gate and the rear shelf;
   cable means having one end wound by the winding device and another end connected to the other one of the tail gate and the rear shelf;
   the winding device comprising a reel for winding the cable means and spring means for biasing the reel so as to wind the cable means onto the reel, the length of the cable means being such that a certain part of the cable means is still left wound on the reel even when the tail gate is fully open, and the spring means applying an effective tension on the cable means that increases at a rate substantially linearly in proportion to the length of the cable means wound off the reel until the tail gate reaches a position near its fully open position and the increase rate of the effective tension of the cable means increases substantially when the tail gate is at the position near its fully open position in such a manner that the rear shelf is lifted to its substantially fully lifted position without any substantial drooping when the tail gate is fully open.

2. A rear shelf structure as defined in claim 1, wherein the spring constant of the spring means is substantially greater when the tail gate is fully open than when the tail gate is closed.

3. A rear shelf structure as defined in claim 2, wherein the length of the cable means is such that the rear shelf may be lifted to its substantially upright position even when the tail gate is fully open.

4. A rear shelf structure as defined in claim 2 or 3, wherein the spring means comprises a first spring member which always biases the reel and a second spring member which engages the reel when the cable means has been taken out beyond a certain extent.

5. A rear shelf structure as defined in claim 4, wherein the first spring member comprises a torsion coil spring, and the second spring member comprises a sheet spring which is fixedly secured at its one and is adapted to engage a projection provided in a member connected to the reel by way of speed reduction means at its other end when the cable means has been taken out beyond the certain extent.

6. A rear shelf structure as defined in claim 5, wherein the speed reduction means comprises a pair of gears which have different diameters and mesh each other.

7. A rear shelf structure as defined in claim 1, wherein the effective radius of the reel is smaller when the tail gate is substantially fully open than when the tail gate is substantially closed.

8. A rear shelf structure as defined in claim 7, wherein the length of the cable means is such that the rear shelf may be lifted to its substantially upright position even when the tail gate is fully open.

9. A rear shelf structure for lifting a rear shelf provided behind a rear seat cooperative with the opening action of a tail gate, comprising:
   a winding device atttached to either one of the tail gate and the rear shelf;
   cable means having one end wound by the winding device and another end connected to the other one of the tail gate and the rear shelf;
   the winding device comprising a reel for winding the cable means and spring means for biasing the reel so as to wind the cable means onto the reel, the length of the cable means being such that a certain part of the cable means is still left wound on the reel even when the tail gate is fully open, and the effective tension which the spring means applies to the cable means being greater when the tail gate is substantially fully open than when the tail gate is substantially closed;
   wherein the reel comprises a first portion and a second portion which is adapted to rotate relative to the first portion and surrounds the first portion, and the spring means biases the first reel so as to wind the cable means thereon, the second portion being greater in effective diameter than the first portion and provided with a gap through which the cable means may pass through to be wound on both the first and the second portions.

10. A retractor device for winding a string-like object comprising:
   a first reel which is supported in a freely rotatable manner;
   a second reel supported on the outer periphery of the first reel in a freely rotatable manner relative to the first reel;
   the first reel being spring biased toward one direction, the second reel being provided with a gap which the string-like object may pass through so as to be wound on both the first and the second reel.

* * * * *

UNITED STATES PATENT AND TRADEMARK OFFICE
CERTIFICATE OF CORRECTION

PATENT NO. : 4,728,141
DATED : March 1, 1988
INVENTOR(S) : Yasuki Motozawa, Tatsuo Masuda and Shuichi Yamamoto It is certified that error appears in the above-identified patent and that said Letters Patent is hereby corrected as shown below:

On the title page [73], correct the Assignee Information by adding the name of the second Assignee, that is missing from the patent, as follows:

-- Kato Hatsujo Kaisha Ltd.
City of Kanagawa-ken, Japan --

Signed and Sealed this

Twenty-ninth Day of February, 2000

*Attest:*

Q. TODD DICKINSON

*Attesting Officer*      *Commissioner of Patents and Trademarks*